US012646424B2

(12) United States Patent
Feins et al.

(10) Patent No.: US 12,646,424 B2
(45) Date of Patent: Jun. 2, 2026

(54) SURGICAL TRAINING MODEL INCLUDING A SIMULATED HUMAN PROSTATE AND ASSOCIATED METHODS

(71) Applicant: INTUITIVE SURGICAL OPERATIONS, INC., Sunnyvale, CA (US)

(72) Inventors: Richard H. Feins, Chapel Hill, NC (US); John C. Alexander, Jr., Pinehurst, NC (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 387 days.

(21) Appl. No.: 18/349,194

(22) Filed: Jul. 10, 2023

(65) Prior Publication Data

US 2024/0021105 A1     Jan. 18, 2024

Related U.S. Application Data

(60) Provisional application No. 63/368,261, filed on Jul. 13, 2022.

(51) Int. Cl.
*G09B 23/30*          (2006.01)
(52) U.S. Cl.
CPC ................................. *G09B 23/306* (2013.01)

(58) Field of Classification Search
CPC ...................................................... G09B 23/306
See application file for complete search history.

(56) References Cited

U.S. PATENT DOCUMENTS

| | | | |
|---|---|---|---|
| 8,852,208 B2 | 10/2014 | Gomez et al. | |
| 9,295,524 B2 | 3/2016 | Schena et al. | |
| 9,358,074 B2 | 6/2016 | Schena et al. | |
| 2019/0251870 A1* | 8/2019 | Myers ................... | G09B 23/34 |

FOREIGN PATENT DOCUMENTS

WO      WO-2012168287 A1 * 12/2012   ............. G09B 23/30

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

*Primary Examiner* — Kesha Frisby
(74) *Attorney, Agent, or Firm* — ALLEN, DYER, DOPPELT, GILCHRIST, P.A. Attorneys at Law

(57) ABSTRACT

A surgical training model for simulating human prostate surgery may include a harvested porcine urethra. A harvested porcine vagina surrounds a portion of the harvested porcine urethra to define a simulated human prostate.

25 Claims, 7 Drawing Sheets

SURGICAL TRAINING MODEL INCLUDING A SIMULATED HUMAN PROSTATE AND ASSOCIATED METHODS

PRIORITY APPLICATION(S)

This application is based upon U.S. provisional patent application Ser. No. 63/368,261, filed Jul. 13, 2022, the disclosure which is hereby incorporated by reference in its entirety.

FIELD OF THE INVENTION

The present invention is directed to surgical training, and more particularly, to a surgical training model and related methods.

BACKGROUND OF THE INVENTION

Surgical procedures may be performed using open or general surgery, laparoscopic surgery, and/or robotically assisted surgery. To become qualified to perform surgical procedures, surgeons participate in comprehensive training to become proficient in the variety of tasks required to perform the procedures. Such tasks include inserting and directing surgical tools to anatomical features of interest such as tissue or organs, manipulating tissue, grasping, clamping, cutting, sealing, suturing, and stapling tissue, as well as other tasks. To gain proficiency, it is beneficial to allow surgeons to repeatedly practice these tasks for multiple different procedures. In addition, it can be beneficial to quantify training and performance of such tasks by surgeons, thereby enabling them to track progress and improve performance.

Various surgical training systems have been developed to provide surgical training. For example, training may be conducted on human cadavers. However, cadavers may be expensive and provide limited opportunities to train. In addition, a single cadaver may not allow the surgeon to repeatedly practice the same procedure. Surgical tissue models have also been utilized for surgical training. However, these tissue models may not be suitable for training minimally invasive procedures using laparoscopic or robotically assisted tools. In minimally invasive procedures, the surgical tools are inserted into the body via natural orifices or small surgical incisions and then positioned near the anatomical features of interest.

Harvested porcine tissue has been used to develop surgical training models for use in thoracic and cardiac surgery because the anatomy of the porcine organs, such as the heart and lungs, are similar in anatomy to human organs. However, there are no animals, including the pig, that have the necessary prostate anatomy to simulate human prostate anatomy. Dogs and pigs have anatomical differences that make their harvested prostate unacceptable to simulate a human prostate for use in surgical training. Much larger animals, such as a gorilla, may have a more realistic prostate anatomy to simulate a human, but the harvesting of gorilla tissue for robotic surgical training is unacceptable for numerous reasons. There are no acceptable real tissue examples from the animal world for simulating the human prostate, except human prostate tissue, which makes robotic surgical training for prostate surgery difficult.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

A surgical training model for simulating human prostate surgery may include a harvested porcine urethra and a harvested porcine vagina may surround a portion of the harvested porcine urethra to define a simulated human prostate.

A harvested porcine bladder may be coupled to the harvested porcine urethra adjacent the harvested porcine vagina. A spacer may be between the harvested porcine vagina and adjacent portions of the harvested porcine urethra. Harvested porcine lateral connective tissue may be coupled to the harvested porcine vagina. Additional harvested porcine tissue may be adjacent the harvested porcine vagina and configured to simulate a human vas deferens. Additional harvested porcine tissue may be adjacent the harvested porcine vagina and configured to simulate a human seminal vesicle.

Additional harvested porcine tissue may be adjacent the harvested porcine vagina and configured to simulate a human vascular pedicle. Harvested porcine recto-sigmoid tissue may be adjacent the harvested porcine vagina.

A tissue cassette for surgical training for simulating human prostate surgery may comprise a body member configured to be removably coupled to a mannequin. A harvested porcine urethra may be carried by the body member. A harvested porcine vagina may be carried by the body member and may surround a portion of the harvested porcine urethra to define a simulated human prostate.

Another aspect is directed to a method for making a surgical training model for simulating human prostate surgery. The method may comprise positioning a harvested porcine vagina to surround a portion of the harvested porcine urethra to define a simulated human prostate.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
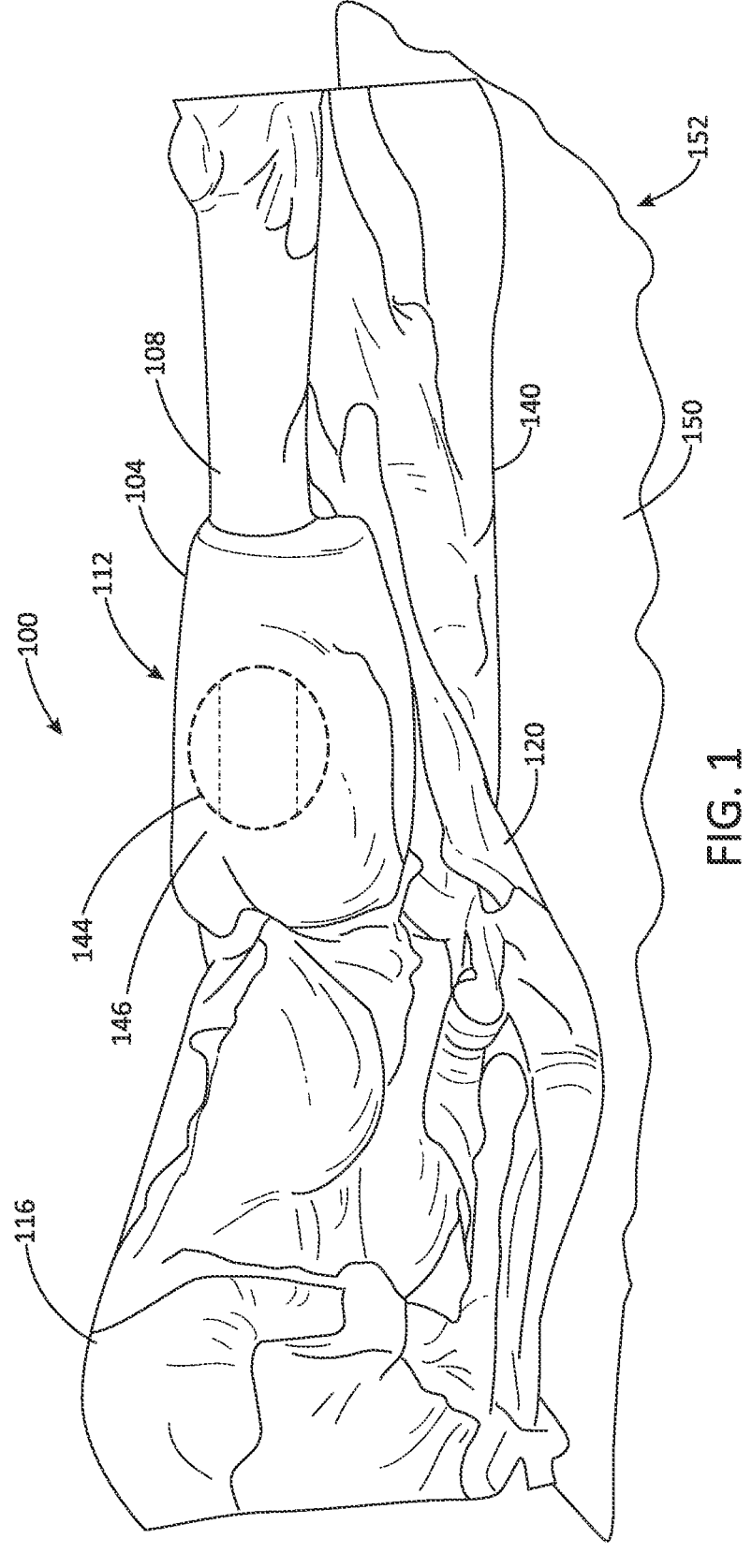
FIG. 1 is an image of the surgical training model for stimulating human prostate surgery showing the harvested porcine vagina surrounding a portion of the harvested porcine urethra to define a simulated human prostate.
Figure 2:
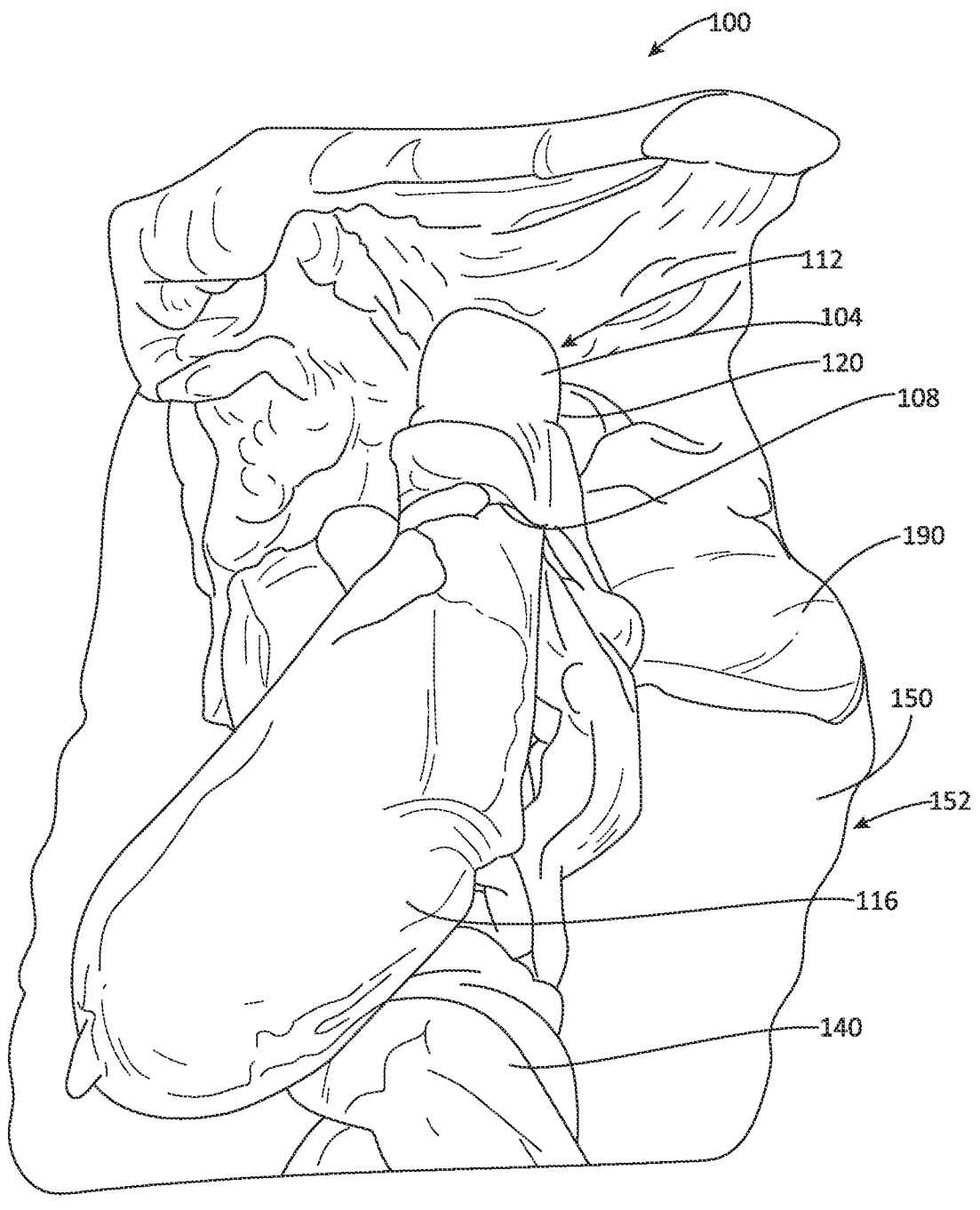
FIG. 2 is an image of the surgical training model showing the harvested porcine bladder coupled to the harvested porcine urethra adjacent to the harvested porcine vagina and carried by the body member as part of a tissue cassette platform.
Figure 3:
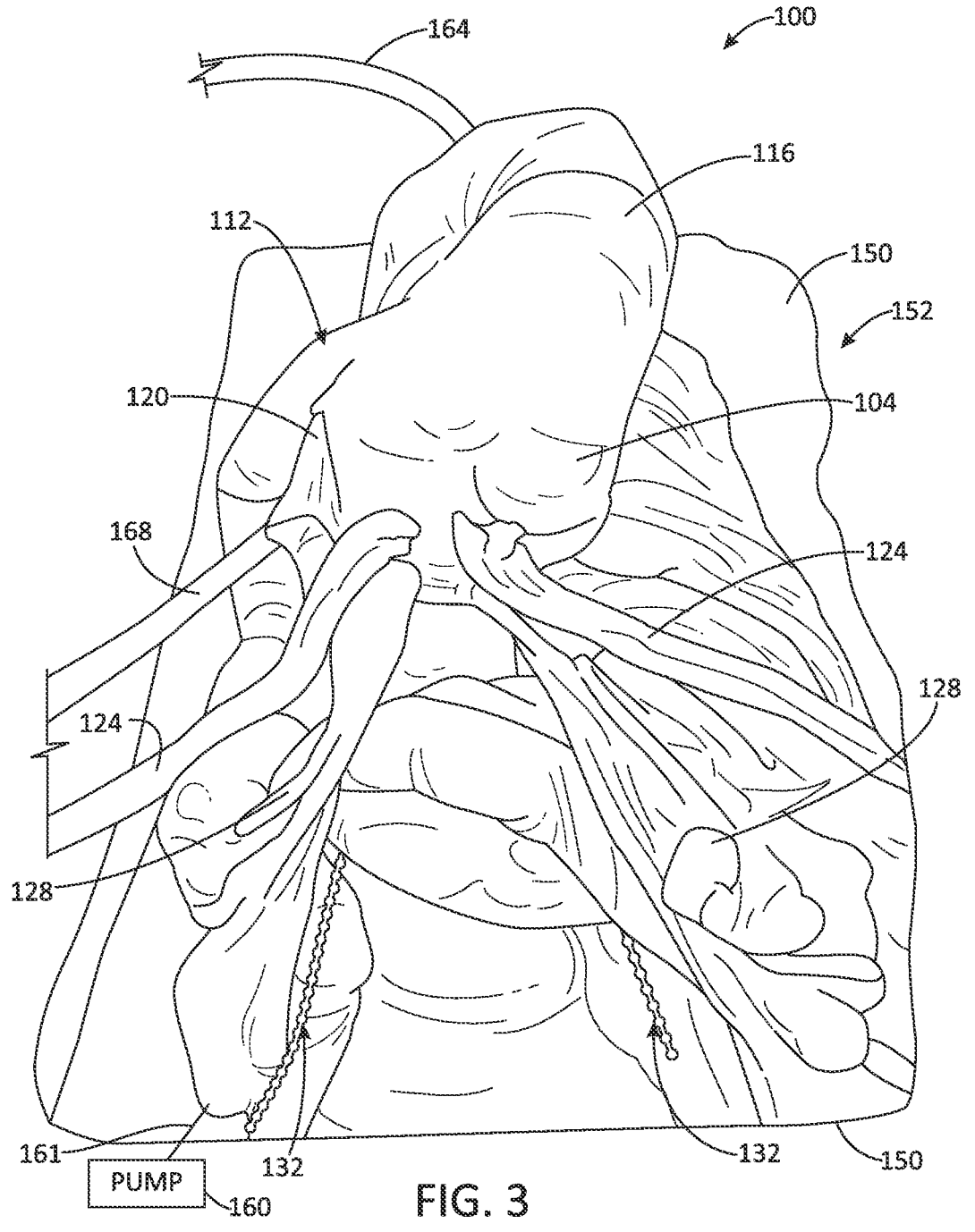
FIG. 3 is a posterior view of the surgical training model showing additional harvested porcine tissue adjacent the harvested porcine vagina configured to simulate a human vas deferens, human seminal vesicle, and human vascular pedicle.

Referring now to FIGS. 1-3, there are illustrated images of a real tissue surgical training model 100 for simulating human prostate surgery. A harvested porcine vagina 104 surrounds a portion of harvested porcine urethra 108 to define a simulated human prostate shown generally at 112. A harvested porcine bladder 116 is coupled to the harvested porcine urethra 108 adjacent to the harvested porcine vagina 104. Harvested porcine lateral connective tissue 120 is coupled to the harvested porcine vagina 104 and may aid in supporting the harvested porcine vagina and other tissue components on a suitable support structure (FIGS. 1 & 2).

Referring now to FIG. 3, a first set of additional harvested porcine tissue 124 is adjacent the harvested porcine vagina 104 and may be stitched or glued to the harvested porcine vagina 104 on respective left and right sides of the harvested porcine vagina 104 and configured to simulate a human vas deferens. In this example, the additional harvested porcine tissue 124 simulating the human vas deferens may be formed by a short segment of harvested porcine ureter, which has the characteristics of human vas deferens as an ejaculatory duct from the human epididymis. A second set of additional harvested porcine tissue 128 is adjacent the harvested porcine vagina 104 and may be stitched or glued to the harvested porcine vagina 104 and configured to simulate a human seminal vesicle. In this example, the simulated human seminal vesicle 128 may be formed by a crushed porcine ovary with ligaments attached and simulate the convoluted tubular glands that lie behind the urinary bladder 116. A third set of additional harvested porcine tissue 132 is adjacent the harvested porcine vagina 104 and may be stitched or glued to the harvested porcine vagina 104 and configured to simulate a human vascular pedicle that provides the main arterial supply for the human prostate gland. Because in FIG. 3 the vascular pedicle 132 would be more hidden by other segments of harvested porcine tissue, the vascular pedicle is shown by the dotted line indicated by the arrow and indicia 132. By way of example, the simulated human seminal vesicle 128 may define a simulated aortic iliac artery and connecting vessels.

As shown in FIG. 1, harvested porcine recto-sigmoid tissue 140 is adjacent the harvested porcine vagina 104 and simulates the human colon and rectum. An optional spacer 144, shown by the dashed lines at 144 in FIG. 1, may be positioned between the harvested porcine vagina 104 and adjacent portions of the harvested porcine urethra 108 (e.g., the spacer 144 may be positioned concentrically between the harvested porcine vagina 104 and the harvested porcine urethra 108). In an example, the spacer 144 may be a small, firm ball having a hole and placed into the harvested porcine vagina 104. The urethra 108 may be pulled through the hole in the spacer 144, which in an example of a ball, may be configured and dimensioned in size to impart a configuration similar to a walnut to the harvested porcine vagina 104 and simulate the configuration of the human prostate. In an example, the harvested porcine vagina 104 may be slit and opened longitudinally, and the harvested porcine urethra 108 inserted. The harvested porcine vagina 104 is then wrapped around the harvested porcine urethra 108. The harvested porcine vagina 104 may be sutured into a closed position indicated by the suture line at 146 or closed using surgical staples or other tissue closing mechanisms such as an adhesive.

The harvested porcine urethra 108 and harvested porcine vagina 104 are carried by a body member 150, shown schematically in each of FIGS. 1-3, and configured to be removably coupled to a mannequin (not shown). The body member 150 forms part of a tissue cassette platform 152 that supports the simulated human prostate 112 and other harvested porcine tissue for surgical training for simulating human prostate surgery. The use of a tissue cassette platform 152 allows a trainee surgeon to operate on the surgical training model 100. When surgical training on that particular surgical training model 100 is done, the tissue cassette platform 152 may be removed from the mannequin or other surgical support and replaced with another tissue cassette platform. Surgical training is repeated using the new tissue cassette platform 152 supporting a new and unused surgical training model 100.

As shown in FIG. 3, a catheter 164 may be inserted within the harvested porcine bladder 116 as a Foley catheter, for example. As shown in FIG. 3, the surgical training model 100 may also include neuro-fibers 168, which in an example, may be held by a clamp (not shown). It is possible to add a fluid pump 160 to an additional ureter that simulates a blood vessel 161 or to an actual blood vessel or blood vessel substitute, such as to simulate actual blood.

Figure 4:
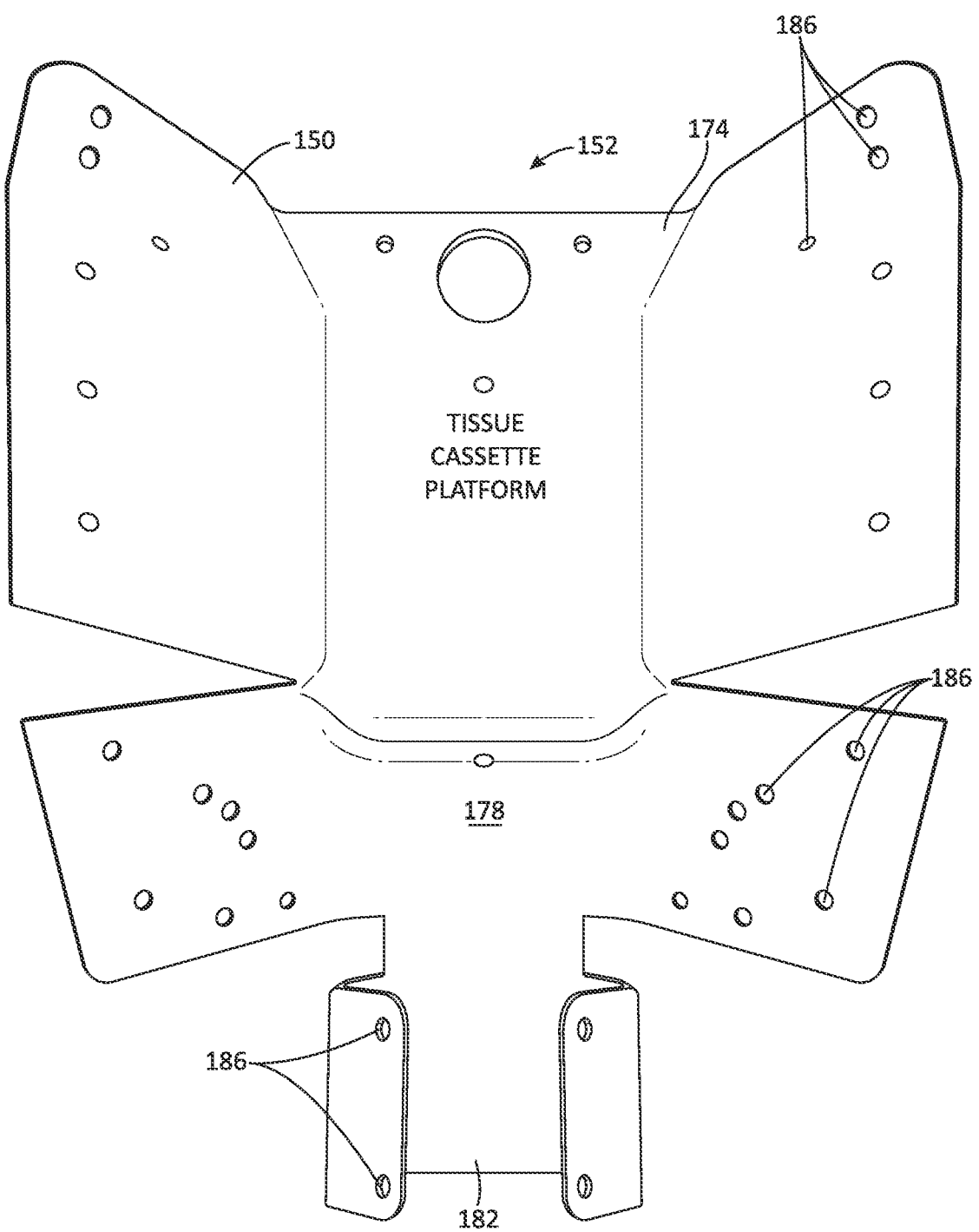
FIG. 4 is a plan view of the tissue cassette platform shown schematically in FIGS. 1-3.

The surgical training model 100 is preferably mounted on the body member 150 as part of the tissue cassette platform 152 as shown in FIG. 4, and configured to be removably coupled to a mannequin or other universal base (not shown) to facilitate surgical training. The tissue cassette platform 152 supports the surgical training model 100, which may be retained on the body member 150 by plastic ties or other fasteners. The tissue cassette platform 152 is shown in its plan view at FIG. 4, and includes an inclined end 174 and a planar platform 178 on which the surgical training model 100 rests and may be secured. Tubes or other hoses 164 (FIG. 3) that supply pneumatic or other fluids, such as simulated air or fake blood for blood flow, may pass through a reduced size, crimped end section 182 opposite the inclined end 174 and connect to any simulated organs at the surgical training model 100 and receive as an example a pulsating blood flow. One or more tubes 164 or other fluid supply lines may be retained onto the tissue cassette platform 152 via any tabs or plastic ties positioned at the reduced size, crimped end section 182 and at other sections on the tissue cassette platform. For example, as shown in the plan view of FIG. 4, the body member 150 forming the tissue cassette platform 152 may include numerous mounting holes 186 that can receive plastic ties or other fasteners that retain any tubes or harvested porcine tissue onto the body member 150.

The surgical training model 100 as described operates as a prosthetic surgical training simulator and includes the harvested porcine vagina 104 and harvested porcine urethra 108 as the simulated human prostate 112 secured to the tissue cassette platform 152, allowing for the practicing of robotic, laparoscopic and other surgical skills required for a variety of prostatic surgical procedures. The surgical training model 100 allows for surgical training on real tissue in a real-time, simulated surgical environment in an appropriate site, such as at different surgical training centers, or at a university medical school or hospital training facility. The harvested porcine tissue forming the simulated human prostate 112 is excess tissue from pigs that has been harvested for food production, as an example. The tissue cassette platform 152 may be formed from a formable synthetic material, such as Kydex, and configured to be removably coupled to a mannequin or positioned on another, general training platform as part of a surgical simulator for manual, laparoscopic, or robotic surgical training. The body member 150 forming the tissue cassette platform 152 may be covered on its top surface with pork belly tissue 190, a portion shown in FIG. 2 covering a part of the body member 150.

Figure 5:
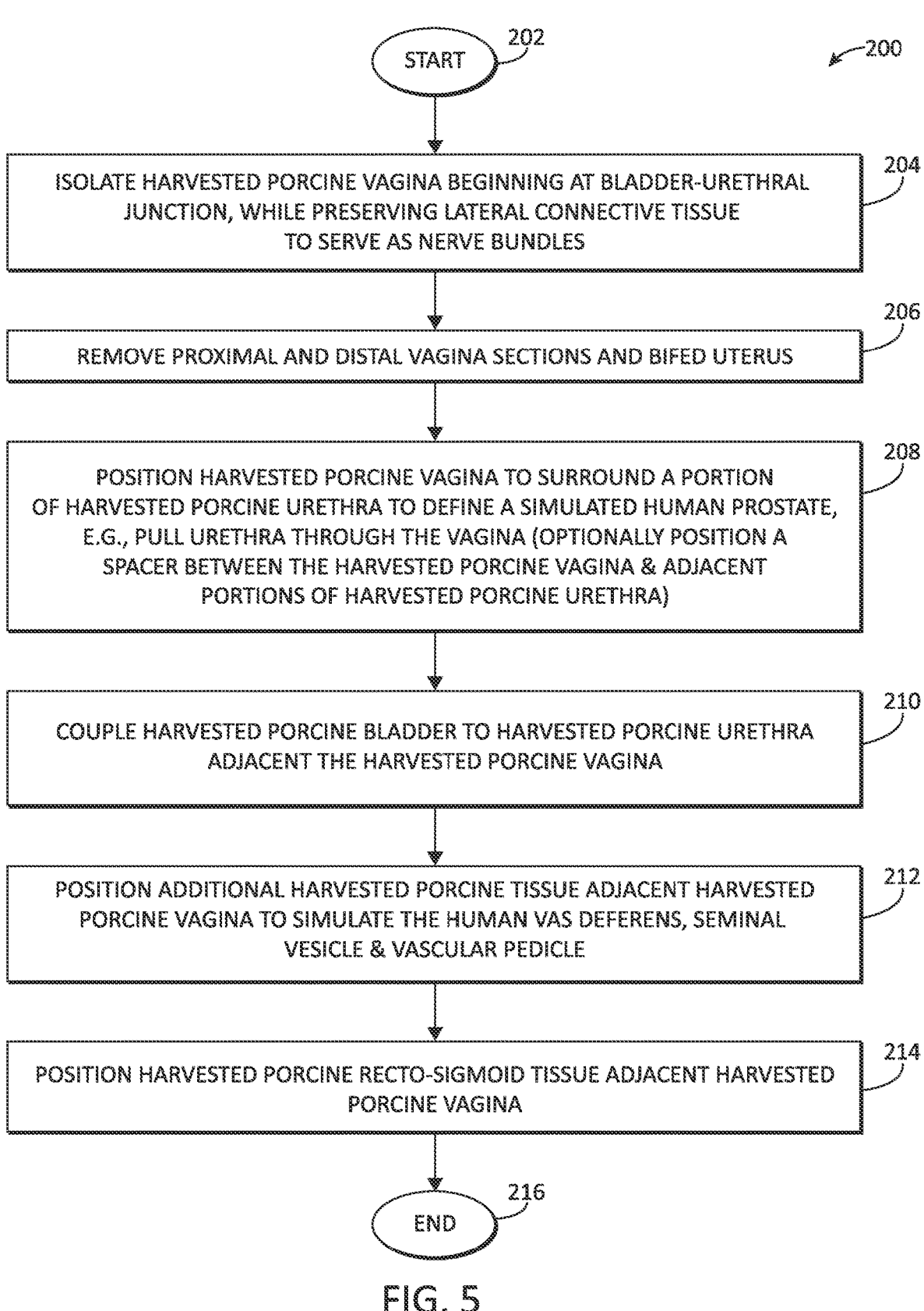
FIG. 5 is a flowchart showing a method for making the surgical training model.

Referring now to FIG. 5, there is illustrated a flowchart 200 for a method for making the surgical training model 100 for simulating human prostate surgery. The process starts (Block 202) and harvested porcine vagina 104 is isolated beginning at the bladder-urethral junction, while preserving the lateral connective tissue 120, which may serve as nerve bundles in the simulated human prostate 112 (Block 204). The proximal and distal vagina sections of the harvested porcine vagina 104 are removed together with the bifid uterus as part of the female pig anatomy (Block 206).

The harvested porcine vagina 104 is positioned to surround a portion of harvested porcine urethra 108 to define the simulated human prostate 112. This can be accomplished by pulling the harvested porcine urethra 108 through the harvested porcine vagina 104, or slitting the harvested porcine vagina longitudinally and wrapping the proximal section of the harvested porcine urethra with the harvested porcine vagina. The slit and opened harvested porcine vagina 104 is then closed, e.g. via sutures, glue, or the like, such that the harvested porcine vagina 104 becomes more sphere-like, similar to a walnut configuration, and sits in an anatomic location corresponding to the human male prostate (Block 208). Optionally, a spacer 144 (FIG. 1) may be placed within the segment of the vagina 104 acting as the simulated human prostate 112. As an example, a small, firm ball configured and sized to about a walnut and corresponding to the size of a human prostate, may be placed into the harvested porcine vagina 104, and the harvested porcine urethra 108 pulled through the hole in the ball, forming the simulated human prostate 112.

The harvested porcine bladder 116 is coupled to the harvested porcine urethra 108 adjacent the harvested porcine vagina 104 (Block 210). The first set of additional harvested porcine tissue 124 may be positioned adjacent the harvested porcine vagina 104 to simulate the human vas deferens. For example, a short segment of ureter may be attached on either side of the harvested porcine vagina 104 to replicate the human vas deferens. The second set of additional harvested porcine tissue 128, such as a crushed ovary with ligaments, may be attached to either side of the harvested porcine vagina 104 to replicate the human seminal vesicle. The third set of additional harvested porcine tissue 122, such as vascular tissue, may be attached to either side of the harvested porcine vagina 104 and replicate the vascular pedicle (Block 212). Additional tissue which may or may not contain small blood vessels may be attached to the harvested porcine vagina 104 to simulate neurovascular fibers 168 or bundles.

The harvested recto-sigmoid tissue 140 is secured to the harvested porcine vagina 104 as the simulated human prostate (Block 214). Harvested porcine leaf fat membrane may be employed to create the recto-prosthetic fold and suspend the harvested porcine bladder 116 onto the body member 150 forming the tissue cassette platform 152. Harvested porcine belly tissue or a synthetic substitute may be covered with the harvested porcine diaphragm to simulate the pelvic fascia. Harvested porcine membrane from cull fat or equivalent material may be used to cover the harvested porcine bladder 116 and recto-sigmoid tissue 140 to suspend the bladder at the top section of the surgical training model 100 and forming a configuration similar in human anatomy to the recto-vesicle pouch between the bladder and the colo-rectum. A rubber catheter with a balloon may be placed into the harvested porcine bladder 116 to simulate a Foley catheter, for example. The process ends (Block 216). The completed surgical training model 100 provides for real tissue training. Electrocautery techniques may be practiced and real-time prostate removal techniques with and without suturing.

The real-tissue surgical training model 100 may be used, for example, with remotely operated, computer-assisted or teleoperated surgical systems, such as those described in, for example, U.S. Pat. No. 9,358,074 (filed May 31, 2013) to Schena et al., entitled "Multi-Port Surgical Robotic System Architecture", U.S. Pat. No. 9,295,524 (filed May 31, 2013) to Schena et al., entitled "Redundant Axis and Degree of Freedom for Hardware-Constrained Remote Center Robotic Manipulator", and U.S. Pat. No. 8,852,208 (filed Aug. 12, 2010) to Gomez et al., entitled "Surgical System Instrument Mounting", each of which is hereby incorporated by reference in its entirety. Further, the real-tissue surgical training model 100 described herein may be used, for example, with a da Vinci® Surgical System, such as the da Vinci X® Surgical System or the da Vinci Xi® Surgical System, both with or without Single-Site® single orifice surgery technology, all commercialized by Intuitive Surgical, Inc., of Sunnyvale, California. Although various embodiments described herein are discussed in connection with a manipulating system of a teleoperated surgical system, the present disclosure is not limited to use with a teleoperated surgical system. Various embodiments described herein can optionally be used in conjunction with hand held instruments, such as laparoscopic tools for real-time surgical training with a harvested porcine tissue cassette.

Figure 6:
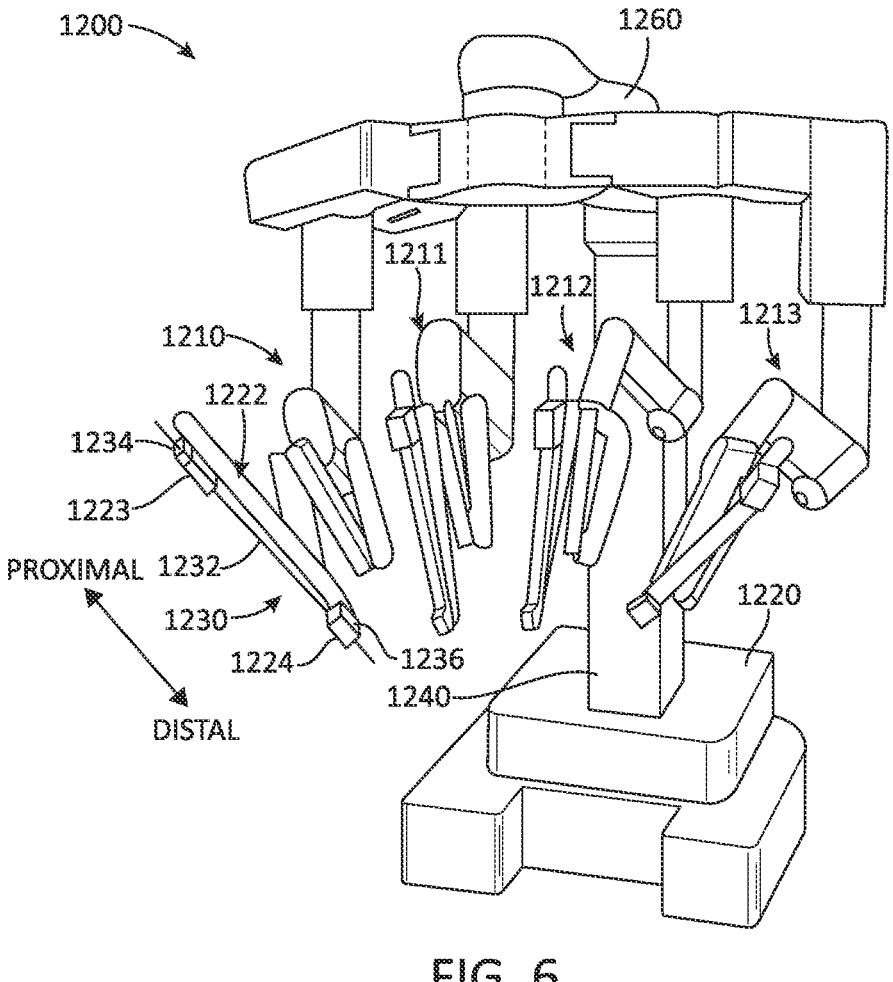
FIG. 6 is a perspective view of a manipulator system according to an example embodiment of the disclosure.

As discussed above, in accordance with various embodiments, surgical tools or instruments of the present disclosure are configured for use in teleoperated, computer-assisted surgical systems employing robotic technology (sometimes referred to as robotic surgical systems). Referring now to FIG. 6, an embodiment of a manipulator system 1200 of a computer-assisted surgical system, to which surgical instruments are configured to be mounted for use, is shown. Such a surgical system may further include a user control system, such as a surgeon console (not shown) for receiving input from a user to control instruments coupled to the manipulator system 1200, as well as an auxiliary system, such as auxiliary systems associated with the DA VINCI X® and DA VINCI XI®, Da Vinci SP.

As shown in the embodiment of FIG. 6, a manipulator system 1200 includes a base 1220, a main column 1240, and a main boom 1260 connected to main column 1240. Manipulator system 1200 also includes a plurality of manipulator arms 1210, 1211, 1212, 1213, which are each connected to main boom 1260. Manipulator arms 1210, 1211, 1212, 1213 each include an instrument mount portion 1222 to which an instrument 1230 may be mounted, which is illustrated as being attached to manipulator arm 1210.

Instrument mount portion 1222 may include a drive assembly 1223 and a cannula mount 1224, with a transmission mechanism 1234 of the instrument 1230 connecting with the drive assembly 1223, according to an embodiment. Cannula mount 1224 is configured to hold a cannula 1236 through which a shaft 1232 of instrument 1230 may extend to a surgery site during a surgical procedure. Drive assembly 1223 contains a variety of drive and other mechanisms that are controlled to respond to input commands at the surgeon console and transmit forces to the transmission mechanism 1234 to actuate the instrument 1230. Although the embodiment of FIG. 7 shows an instrument 1230 attached to only manipulator arm 1210 for ease of viewing, an instrument may be attached to any and each of manipulator arms 1210, 1211, 1212, 1213.

Other configurations of surgical systems, such as surgical systems configured for single-port surgery, are also contemplated. For example, with reference now to FIG. 7, a portion of an embodiment of a manipulator arm 2140 of a manipulator system with two surgical instruments 2300, 2310 in an installed position is shown. The surgical instruments 2300, 2310 can generally correspond to different instruments used for real-time tissue training using the harvested porcine tissue cassette. For example, the embodiments described herein may be used with a DA VINCI SP® Surgical System, commercialized by Intuitive Surgical, Inc. of Sunnyvale, California. The schematic illustration of FIG. 7 depicts only two surgical instruments for simplicity, but more than two surgical instruments may be mounted in an installed position at a manipulator system as those having ordinary skill in the art are familiar. Each surgical instrument 2300, 2310 includes a shaft 2320, 2330 having at a distal end a moveable end effector or an endoscope, camera, or other sensing device, and may or may not include a wrist mechanism (not shown) to control the movement of the distal end.

Figure 7:
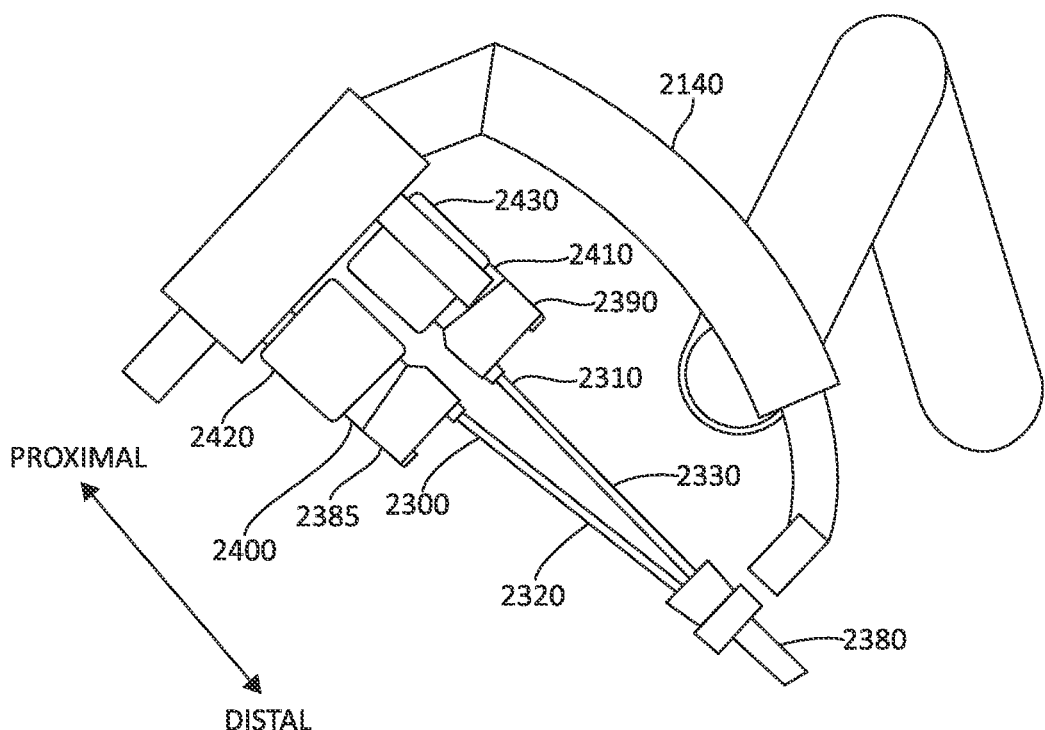
FIG. 7 is a partial schematic view of an embodiment of a manipulator system having a manipulator arm with two instruments in an installed position according to the present disclosure.

In the embodiment of FIG. 7, the distal end portions of the surgical instruments 2300, 2310 are received through a single port structure 2380 to be introduced into the harvested porcine tissue through the opening of the mouth and associated upper and lower jaws and into communication with the oropharynx region. As shown, the port structure includes a cannula and an instrument entry guide inserted into the cannula. Individual instruments are inserted into the entry guide to reach a surgical site corresponding to the oropharynx region of the porcine tissue that simulates the oropharynx region of the human body.

Other configurations of manipulator systems that can be used in conjunction with the present disclosure can use several individual manipulator arms. In addition, individual manipulator arms may include a single instrument or a plurality of instruments. Further, as discussed above, an instrument may be a surgical instrument with an end effector or may be a camera instrument or other sensing instrument utilized during a surgical procedure to provide information, (e.g., visualization, electrophysiological activity, pressure, fluid flow, and/or other sensed data) of a remote surgical site.

Transmission mechanisms 2385, 2390 are disposed at a proximal end of each shaft 2320, 2330 and connect through a sterile adaptor 2400, 2410 with drive assemblies 2420, 2430, which contain a variety of internal mechanisms (not shown) that are controlled by a controller (e.g., at a control cart of a surgical system) to respond to input commands at a surgeon side console of a surgical system to transmit forces to the force transmission mechanisms 2385, 2390 to actuate surgical instruments 2300, 2310.

The embodiments described herein are not limited to the embodiments of FIGS. 6 and 7, and various other teleoperated, computer-assisted surgical system configurations may be used with the embodiments described herein. The diameter or diameters of an instrument shaft and end effector are generally selected according to the size of the cannula with which the instrument will be used and depending on the surgical procedures being performed.

This description and the accompanying drawings that illustrate various embodiments should not be taken as limiting. Various mechanical, compositional, structural, electrical, and operational changes may be made without departing from the scope of this description and the invention as claimed, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to another embodiment, the element may nevertheless be claimed as included in the other embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the example term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as examples. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A surgical training model for simulating human prostate surgery comprising:
    a harvested porcine urethra; and
    a harvested porcine vagina surrounding a portion of the harvested porcine urethra to define a simulated human prostate.

2. The surgical training model of claim 1 comprising a harvested porcine bladder coupled to the harvested porcine urethra adjacent the harvested porcine vagina.

3. The surgical training model of claim 1 comprising a spacer between the harvested porcine vagina and adjacent portions of the harvested porcine urethra.

4. The surgical training model of claim 1 comprising harvested porcine lateral connective tissue coupled to the harvested porcine vagina.

5. The surgical training model of claim 1 comprising additional harvested porcine tissue adjacent the harvested porcine vagina and configured to simulate a human vas deferens.

6. The surgical training model of claim 1 comprising additional harvested porcine tissue adjacent the harvested porcine vagina and configured to simulate a human seminal vesicle.

7. The surgical training model of claim 1 comprising additional harvested porcine tissue adjacent the harvested porcine vagina and configured to simulate a human vascular pedicle.

8. The surgical training model of claim 1 comprising harvested porcine recto-sigmoid tissue adjacent the harvested porcine vagina.

9. A tissue cassette for surgical training for simulating human prostate surgery comprising:
    a body member configured to be removably coupled to a mannequin;
    a harvested porcine urethra carried by the body member; and a harvested porcine vagina carried by the body member and surrounding a portion of the harvested porcine urethra to define a simulated human prostate.

10. The tissue cassette of claim 9 comprising a harvested porcine bladder coupled to the harvested porcine urethra adjacent the harvested porcine vagina.

11. The tissue cassette of claim 9 comprising a spacer between the harvested porcine vagina and adjacent portions of the harvested porcine urethra.

12. The tissue cassette of claim 9 comprising harvested porcine lateral connective tissue coupled to the harvested porcine vagina.

13. The tissue cassette of claim 9 comprising additional harvested porcine tissue adjacent the harvested porcine vagina and configured to simulate a human vas deferens.

14. The tissue cassette of claim 9 comprising additional harvested porcine tissue adjacent the harvested porcine vagina and configured to simulate a human seminal vesicle.

15. The tissue cassette of claim 9 comprising additional harvested porcine tissue adjacent the harvested porcine vagina and configured to simulate a human vascular pedicle.

16. The tissue cassette of claim 9 comprising harvested porcine recto-sigmoid tissue adjacent the harvested porcine vagina.

17. The tissue cassette of claim 9 comprising a body member mounting the harvested porcine urethra, and harvested porcine vagina.

18. A method for making a surgical training model for simulating human prostate surgery comprising:
    positioning a harvested porcine vagina to surround a portion of a harvested porcine urethra to define a simulated human prostate.

19. The method of claim 18 comprising coupling a harvested porcine bladder to the harvested porcine urethra adjacent the harvested porcine vagina.

20. The method of claim 18 comprising positioning a spacer between the harvested porcine vagina and adjacent portions of the harvested porcine urethra.

21. The method of claim 18 comprising coupling harvested porcine lateral connective tissue to the harvested porcine vagina.

22. The method of claim 18 comprising positioning additional harvested porcine tissue adjacent the harvested porcine vagina and configured to simulate a human vas deferens.

23. The method of claim 18 comprising positioning additional harvested porcine tissue adjacent the harvested porcine vagina and configured to simulate a human seminal vesicle.

24. The method of claim 18 comprising positioning additional harvested porcine tissue adjacent the harvested porcine vagina and configured to simulate a human vascular pedicle.

25. The method of claim 18 comprising positioning harvested porcine recto-sigmoid tissue adjacent the harvested porcine vagina.

* * * * *